Nov. 24, 1959 L. H. CONNELL 2,914,266
SELF-ADJUSTING VARIABLE SPEED DRIVE
Filed Feb. 28, 1955 4 Sheets-Sheet 1
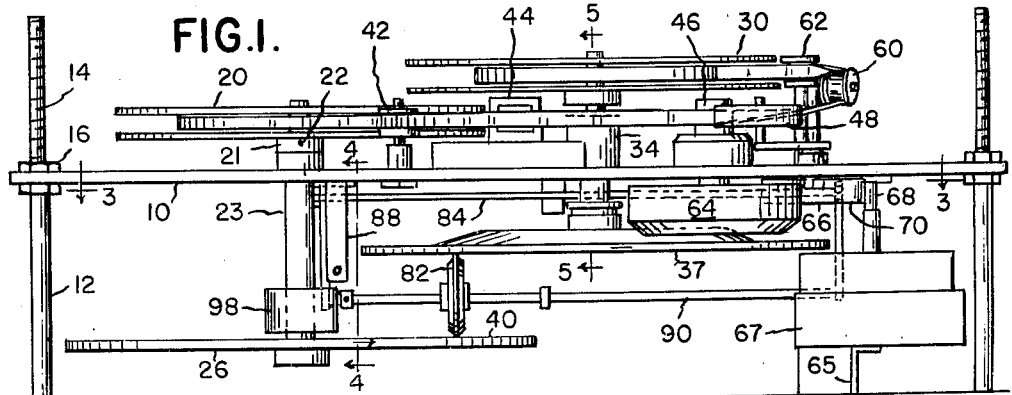
FIG.1.
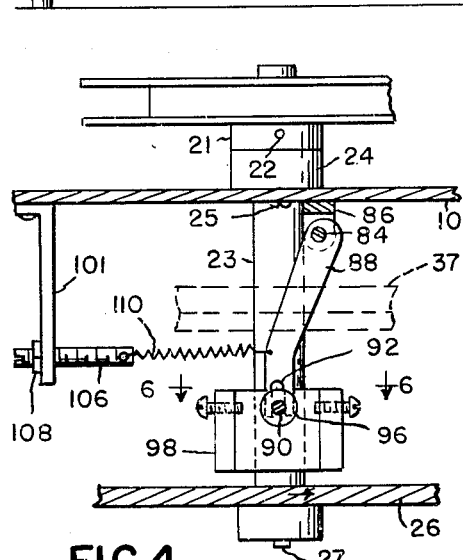
FIG.4.
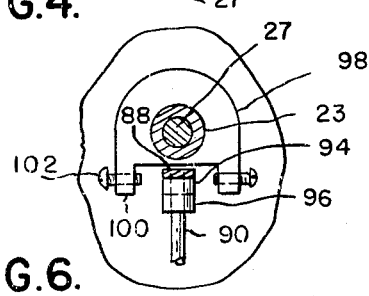
FIG.6.
FIG.5.
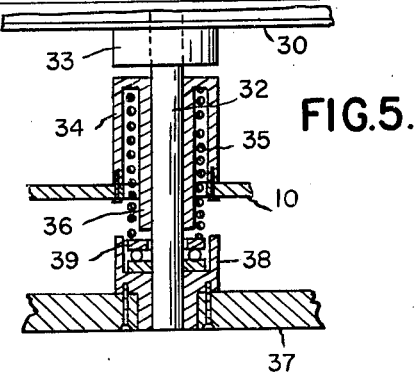
FIG.7.
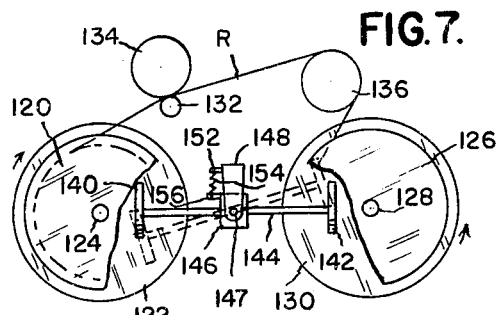
FIG.8.
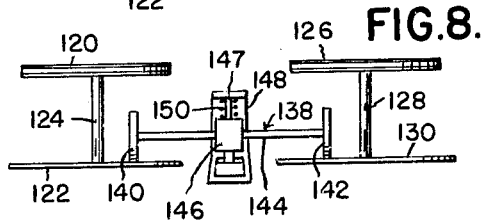
INVENTOR.
LAWRENCE H. CONNELL
BY Whittemore,
Hulbert & Belknap
ATTORNEYS Nov. 24, 1959  L. H. CONNELL  2,914,266
SELF-ADJUSTING VARIABLE SPEED DRIVE
Filed Feb. 28, 1955  4 Sheets-Sheet 3

INVENTOR.
LAWRENCE H. CONNELL
BY Whittemore,
Hulbert & Belknap
ATTORNEYS

Nov. 24, 1959    L. H. CONNELL    2,914,266
SELF-ADJUSTING VARIABLE SPEED DRIVE
Filed Feb. 28, 1955    4 Sheets-Sheet 4
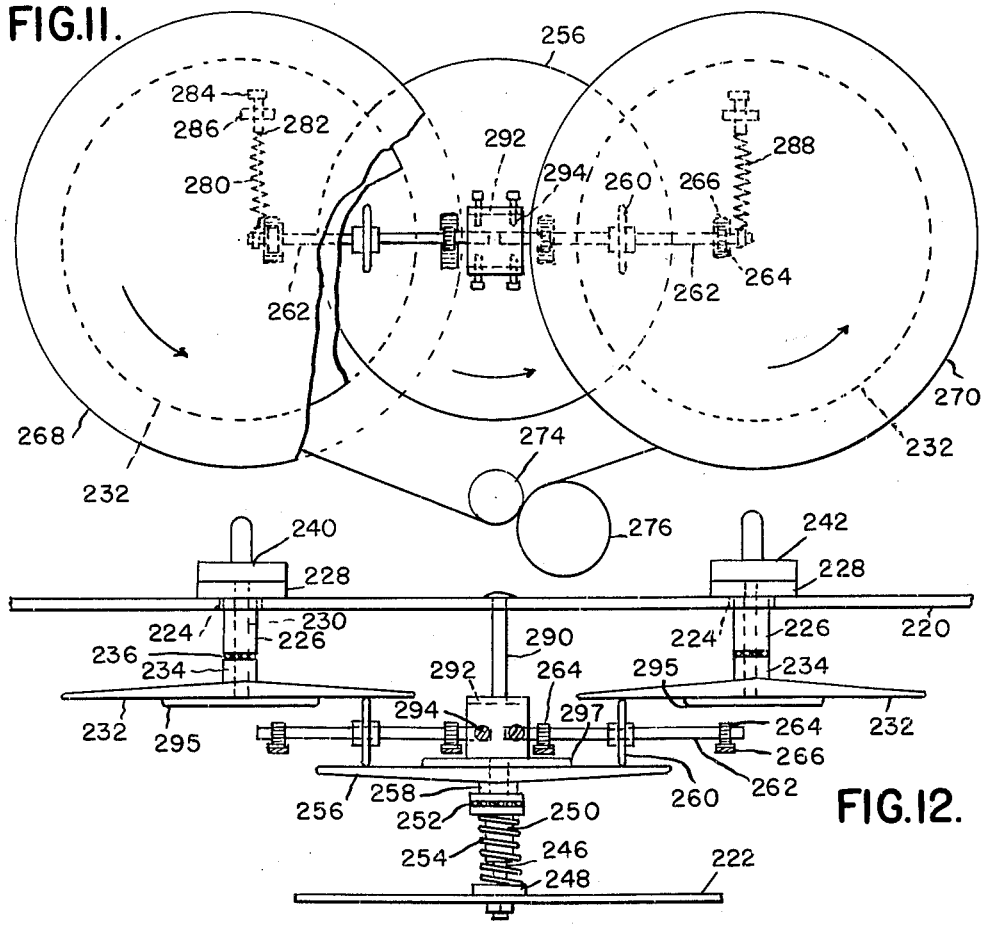
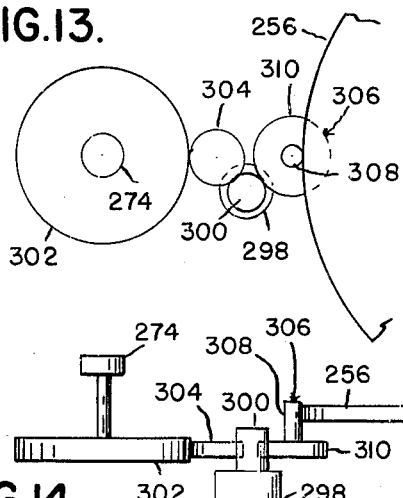
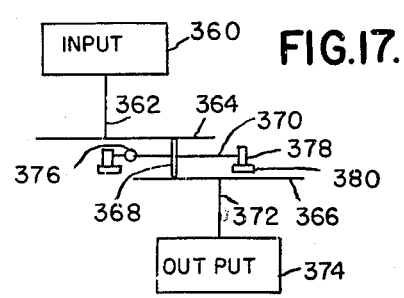
INVENTOR.
LAWRENCE H. CONNELL
BY Whittemore,
Hulbert & Belknap
ATTORNEYS

United States Patent Office 2,914,266
Patented Nov. 24, 1959

2,914,266

SELF-ADJUSTING VARIABLE SPEED DRIVE

Lawrence H. Connell, Haines City, Fla.

Application February 28, 1955, Serial No. 490,860

4 Claims. (Cl. 242—55.14)

The present invention relates to a self-adjusting variable speed drive having many fields of useful application. A drive of this character is particularly useful in association with means for transferring record material, such as film, tape or wire, between reels, but is also useful as a variable ratio power transmission drive.

It is an object of the present invention to provide self-adjusting drive means adapted to vary output speed in accordance with loading.

It is a further object of the present invention to provide a variable speed drive for association with a supply and take-up reel for providing essentially positive drive means for the take-up reel responsive to tension in record material such as film, wire or tape between the reels for maintaining the tension of the material at a substantially constant value.

It is a further object of the present invention to provide means to vary transmission ratio associated with a power source as a function of loading.

More specifically, it is an object of the present invention to provide high friction, essentially positive adjustable drive means for varying the speed of a supply and a take-up reel in accordance with the amount of material on the reels so as to maintain the tension of the material intermediate the reels at a constant value.

Still more specifically, it is an object of the present invention to provide an essentially mechanical linkage intermediate a supply and a take-up reel substantially instantaneously responsive to variations in tension of record material between the reels to adjust relative speed of the reels to maintain tension of the material constant.

It is a further object of the present invention to provide pairs of friction discs, the discs having their axes parallel but spaced apart so as to provide substantial overlap between the discs, a friction roller intermediate the discs having its periphery in friction contact therewith and occupying an intermediate position in which its axis is perpendicular to and intersects the axes of both of said discs, said roller being movable perpendicular to its axis to either side of the intermediate position, said roller being freely movable in a direction parallel to its axis, and resilient means biasing said roller to one side of its intermediate position to produce axial movement of the roller in a predetermined direction to change the speed ratio between said discs.

It is a further object of the present invention to provide means as described in the preceding paragraph in which movement of the roller by the resilient biasing means is variably opposed by forces developed as a consequence of changes in the speed ratio between the discs.

It is a further object of the present invention to provide a similar arrangement as described in the preceding paragraph, comprising more than two discs coupled by two or more friction rollers.

Other objects and features of the invention will become apparent as the description proceeds, especially when taken in conjunction with the accompanying drawings, wherein:

Figure 1 is a front elevational view of the self-adjusting variable speed drive applied to magnetic transducer equipment.

Figure 4 is a fragmentary enlarged section on the line 4—4, Figure 1.

Figure 5 is a fragmentary enlarged section on the line 5—5, Figure 1.

Figure 6 is a fragmentary section on the line 6—6, Figure 4.

Figure 7 is a diagrammatic plan view of another embodiment of the present invention.

Figure 8 is a diagrammatic front elevational view of the structure shown in Figure 7.

Figure 11 is a diagrammatic plan view of another embodiment of the present invention.

Figure 12 is a diagrammatic elevational view of the structure shown in Figure 11.

Figure 13 is a fragmentary diagrammatic plan view showing drive means for driving elements of the device shown in Figures 11 and 12.

Figure 14 is a fragmentary elevational view of the drive means shown in Figure 13.

Figure 17 is a diagrammatic view showing an application of the present invention as a simple variable speed transmission.

Figure 2:
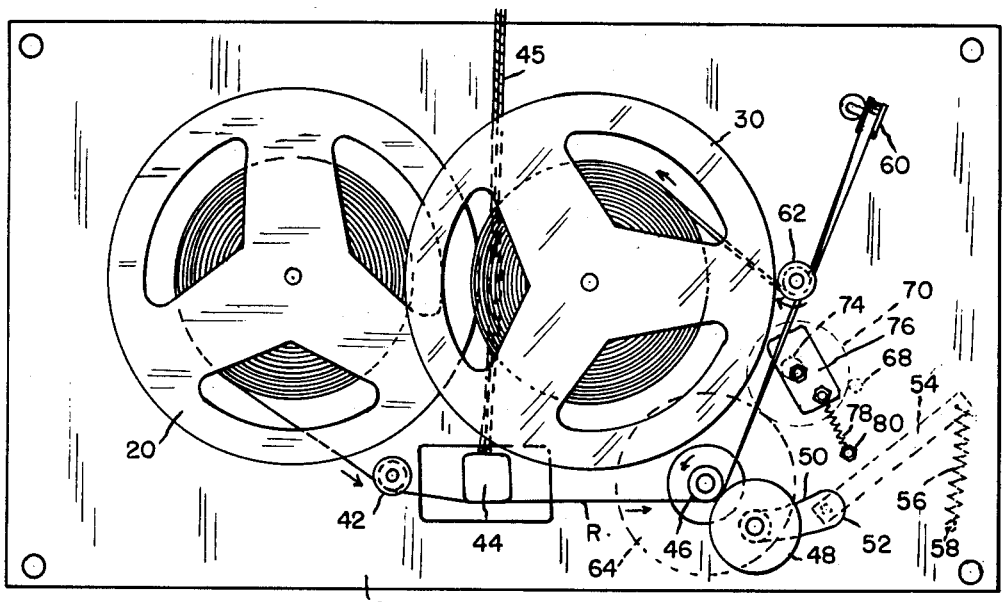
Figure 2 is a plan view of the structure shown in Figure 1.

Referring now to the figures, the transducer comprises a plate 10 herein shown as supported on legs 12 the upper portions of which are threaded as indicated at 14 and the plate is held in position thereon by means of nuts 16. Supported on the plate 10 is a supply reel 20 releasably engaged on a reel support 21 engaged by means such for example as a set screw 22 with a shaft which extends through a bearing 23 having an enlarged head 24 above the plate 10 and rigidly secured thereto by means such for example as screws 25. The friction disc 26 is rigidly clamped to the lower end of the shaft 27 and accordingly rotates in unison with the supply reel 20.

Also carried by the plate 10 is a take-up reel 30, which as best illustrated in Figure 5, is releasably connected to a hub 33, which is in turn connected to shaft 32. Secured to the plate 10 is a bearing and spring retainer 34 adapted to receive a compression spring 35 and having a central bearing portion 36 through which the shaft 32 extends. At its lower end the shaft has connected thereto a friction disc 37 by means of a bearing housing 38 containing a thrust bearing indicated generally at 39. The compression spring 35 bears against the upper race of the thrust bearing and urges it together with the friction disc 37 and the shaft 32 and reel 30 downwardly. In operation the take-up reel 30 and friction disc 37 are retained in the position illustrated in Figure 5, with the hub 33 spaced above the spring retainer 34 by a friction roller 40 which will subsequently be described.

The supply reel 20 and the take-up reel 30 may be associated with film or magnetic record material such for example as flat tape or wire. In the present instance the transducer is illustrated as employing tape. However, the present invention permits the use of fine recording wire while permitting high fidelity recording and reproducing as a result of the uniform speed and tension obtained.

Referring now to Figure 2, the record material R is illustrated as passing around a stationary guide roller 42 and over a magnetic transducer head 44. The magnetic transducer head 44 may be a recording, play-back and erasing head suitably connected by a cord or cable 45 to the recording or reproducing circuits. The record material is drawn from the supply reel 20 by a capstan 46, the record material being pressed against the rotating capstan by a roller 48 having a rubber tire or peripheral portion. The roller 48 is carried by an arm 50 mounted on the plate 10 by a pivot connection 52 having an arm 54 extending therefrom connected to a tension spring 56, the other end of which is connected to a pin 58. The tension spring 56 presses the rubber tired roller 48 against the record element and holds it against the capstan so as to effect a substantially positive driving action as the capstan 46 is rotated. The record material R passes around guide rollers 60 and 62, the latter of which is located to guide the record material onto the take-up reel 30.

The capstan 46 extends through the plate 10 where it connects to a relatively heavy fly wheel 64. Suspended from the underside of the plate 10 by a bracket 65 carried by screws 66 is a drive motor 67 having a motor shaft 68 extending upwardly in spaced relation from the periphery of the fly wheel 64. In order to effect driving of the fly wheel 64 from the motor shaft 68 there is provided a pinch wheel 70 mounted on a shaft 72 which extends upwardly through an enlarged opening 74 in the plate 10 where it is connected to a flat movable guide plate 76. The guide plate 76 has connected thereto a tension spring 78 anchored as indicated at 80 in such position as to urge the pinch wheel 70 into the space between the motor drive shaft 68 and the fly wheel 64 to thereby cause rotation of the motor shaft 68 to rotate the fly wheel and hence the capstan 46 connected thereto.

In order to produce high fidelity recording with magnetic material, and particularly with fine wire, it is essential to maintain uniform speed of the wire past the recording or play-back head and to maintain the wire under uniform tension. In the present case this is accomplished by a self-adjusting variable speed drive which includes friction discs 26 and 37 previously referred to, the friction roller 40, and means mounting the friction roller 40 for automatic self-adjustment during operation of the transducer so as to maintain movement of the tape or wire past the head 44 at a constant rate and to maintain the record material under substantially constant uniform tension.

The surfaces of the discs 26 and 37 which contact the roller 40 are preferably provided with a coating of friction material such as canvas impregnated with pure gum rubber. The coating should be as thin as practical to minimize power loss in the system.

The roller 40 on the other hand is preferably hard and rigid, and may be formed of fibrous material impregnated with a suitable phenolic resin. The roller 40 preferably is provided with a flat peripheral surface such as indicated at 82 which may be approximately 1/16 inch in width. The lower friction disc 26 is prevented from moving downwardly by engagement between the reel supporting member 21 and the head 24. At the same time the friction disc 37 is urged downwardly with a predetermined force by means of the compression spring 35 previously described. Accordingly, the roller 40 is in firm pressure contact with high friction surfaces provided at adjacent sides of the friction discs 26 and 37. The materials and pressure are such that the drive in effect is essentially a positive mechanical drive. It is recognized that in practice the contact extends over a small area and a slight amount of slippage between the inner and outer radii, or the axially inner and outer contacting portions of the roller and discs, must occur. This is desirable since it permits transmission of relatively heavy loads, which may occur, without any appreciable creep between the parts.

Figure 3:
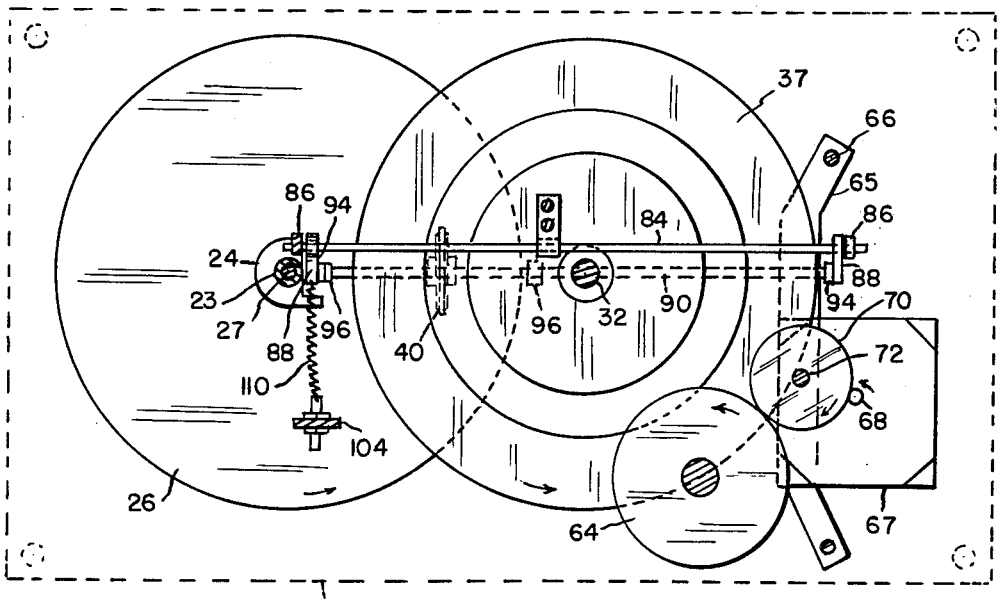
Figure 3 is a section on the line 3—3, Figure 1.

The roller 40, as best seen in Figures 3, 4 and 6, is mounted on an oscillating framework comprising a shaft 84 mounted for rocking movement in bracket 86 secured to the underside of the plate 10. Adjacent opposite ends and inwardly of the brackets 86, the shaft 84 has brazed or otherwise secured thereto arms 88. At the lower ends of the arms there is provided a shaft 90 the ends of which extend into vertically elongated slots 92 provided in the arms 88 to permit the shaft 90 to remain in the same horizontal plane as the arms 88 oscillate about the axis of the shaft 84 so as to maintain the roller 40 always in contact with the adjacent surfaces of the overlapped portions of the friction discs 26 and 37. Collars 94 may be provided to retain the ends of the shaft 90 in the slots in the lower ends of the arms. In addition, abutment collars 96 are provided to prevent the roller 40 from moving out of the overlapped zone between the discs 26 and 37.

In order to limit oscillation of the frame about the axis of the shaft 84, a block 98 is provided on the bearing 23 at one end into which the lower end of one of the arms 88 and the associated collar 94 extends. The block 98 as best seen in Figure 6, has projecting ears 100 provided with adjustable abutment screws 102 so as to limit rocking movement of the framework including the roller supporting shaft 90.

Secured to the underside of the plate 10 is a bracket 101 having an elongated threaded element 106 extending therethrough and provided with a nut 108. Connected to the threaded element 106 is a tension spring 110 which connects to one of the arms 88, biasing the frame in the direction as best illustrated in Figure 3.

In operation it will of course be apparent that the proper rate of rotation of the two reels 20 and 30, in order to maintain uniform tension on the record material therebetween, should be related to the radii of the accumulated record material thereon. In operation rotation of the motor rotates the fly wheel 64 through the pinch wheel 70 and rotation of the fly wheel results in rotation of the capstan 46. Rotation of the capstan in conjunction with the roller 48 draws record material from the supply reel 20 at a uniform rate. Rotation of the supply reel 20 results in like rotation of the friction disc 26 which will rotate in the direction of the arrow, as shown in Figure 3. Rotation of the friction disc 26 results in rotation of the roller 40 in such a direction as to transmit rotation to the friction disc 37 in the same direction as that of the disc 26 and as also indicated by the arrow in Figure 3. With the record material extending around the various guide rollers as shown in Figure 2, it will be apparent that as the record material is withdrawn from the supply reel 20 it is wound up onto the take-up reel 30.

In order that this may be accomplished in a uniform manner with the wire or tape always under uniform tension, it is of course necessary that the speed of rotation of the take-up reel be decreased as more record material accumulates thereon and as the speed of rotation of the supply reel increases as the effective radius of the record material thereon is reduced. The self-adjusting variable speed drive as disclosed herein accomplishes this required result.

Referring first to Figure 3, it will be observed that when the axis of the shaft 90 is perpendicular to and intersects the axes of the disc supporting shafts 27 and 32, rotation will be transmitted from the disc 26 to the disc 37 without any tendency to cause the roller 40 to travel in either direction longitudinally of the shaft 90. This of course is for the reason that the point or center of contact between each of the discs and the surface of the roller 40 is moving in a direction perpendicular to the axis of the shaft 90.

If however, the shaft 90 is displaced to either side of its intermediate position, forces are immediately developed tending to cause the roller 40 to shift axially on the shaft 90. Assume for example that the roller 40 moves upwardly from the dotted line position illustrated in Figure 3. Its contact with the friction disc 26 is therefore at a point where the contacting element of the friction disc has a component of motion both upwardly and to the left in the figure. At the same time, the contact between the roller and an element of the friction disc 37 also results in forces tending to move the roller to the left because the element of the friction disc 37 in contact with the surface of the roller has components of motion both downwardly and to the left as seen in the figure. Since the roller 40 is freely movable axially on the shaft 90, it will continue to move to the left so long as the shaft remains displaced from the intermediate position in which its axis intersects the axes of the shafts 27 and 32. Conversely, of course, if the shaft 90 is moved downwardly from the position illustrated in dotted lines in Figure 3, the actions and reactions between it and the surfaces of the friction discs result in travel of the roller to the right as seen in this figure.

It will of course be obvious that movement of the roller to the right from the position illustrated in dotted lines in Figure 3 will increase the radius of the portion of the disc 26 contacting the roller and will correspondingly decrease the radius of the portion of the disc 37 in contact with the roller. Assuming uniform velocity of rotation of the disc 26, this will result in an increase in velocity of the disc 37.

Inasmuch as the friction discs are rigidly connected through the shafts 27 and 32 to the corresponding reels 20 and 30, movement of the roller 40 results in automatic self-adjustment of the speed of rotation of the reels.

Movement of the shaft 90 to either side of its intermediate position is dependent upon resultant forces developed by the spring 110 and tension developed in the record material R. Furthermore, as will presently be described, the tension developed in the record material by the automatic self-adjusting drive is predetermined and dependent upon tension in the spring 110.

Assume the device in operation with substantial quantities of record material on both the supply and the take-up reel as illustrated in Figure 2, and with the shaft 90 in intermediate position as illustrated in Figure 4, and with the tension in the tape just sufficient to counterbalance the tension of the spring 110. Input or driving disc 26 supplies power to drive roller 40 which in turn drives disc 37. In Figure 3 the position of roller 40 is indicated in dot and dash lines. If the driven or output disc 37 were momentarily arrested or slowed down, as for example by excessive tension in the material R, continued rotation of roller 40 would cause it to roll about an instantaneous center which would be its point of contact with disc 37. This would shift roller 40 and shaft 90 to the right as seen in Figure 4, or upwardly as seen in Figure 3, extending spring 110. This in turn, as previously described, would cause roller 40 to travel to the left as seen in Figures 2 and 3, thus decreasing the speed of driven disc 37, relieving tension in the record material R, and permitting the spring to move the shaft 90 toward its neutral position.

Conversely, if for any reason the tension in the tape or wire record material tends to fall below the value maintained by the tension setting of the spring 110, the roller 40 immediately shifts to the left as seen in Figure 4, or downwardly as seen in Figure 3, and there immediately follows a correcting axial movement thereof which restores the tape or wire record material to its desired tension.

In actual operation the roller 40 travels axially as a result of the continuous change in effective radii of the quantity of record material on the reels and this axial travel of the roller 40 is dependent upon an average lateral displacement of the axis of the shaft 90 from the intermediate or neutral position in which it intersects the axes of the shafts 27 and 32. Due to actual small area high friction contact between the surface of the roller and the surfaces of the friction discs there is in operation a small but constant slippage between the outer and inner portions of the contacting surfaces of the roller and friction discs with the result that a uniform essentially positive driving action takes places which results in a smooth action and substantially constant tension in the record material. This is to be contrasted with the results which would be obtained if the roller 40 at some time had true rolling contact with the surfaces of the friction discs and at other times was required to have slippage with respect thereto. This change from rolling to sliding contact would introduce substantial variations in tension of the record material.

It will of course be apparent that the apparatus will operate equally well with rotation of the reels in either direction so that the motor may be provided with speed control and directional control devices to permit rapid rewinding of the tape if required.

One may consider that at any instant there is a fixed ratio of positive mechanical drive. When this is considered in conjunction with the supply reel, capstan, take-up reel, and tape, there is a closed mechanical system of low friction. Any change in tension of tape on either side of the capstan would immediately be reflected in a corresponding change on the other side through the mechanical ratio drive. Thus, erratic loading of the capstan tending to cause speed changes in the movement of the tape is avoided and accordingly, constant speed with corresponding high fidelity is achieved.

It is recognized of course that some friction in the system is inherent, and further, that this friction is variable as a result of losses resulting from shifting of the roller toward and away from the line joining the axes of the discs. Moreover, inertia, while small, is present. The combined effect of the variable friction and inertia with respect to load variations is such that any speed variations resulting in the tape tend to be in an inaudible range.

A somewhat different embodiment of the present invention is illustrated in Figures 7 and 8. In these figures a supply reel 120 is diagrammatically illustrated as connected to a friction disc 122 by a shaft 124. A take-up reel 126 is illustrated as connected by shaft 128 with friction disc 130. As best indicated in Figure 7, tape or other record material R is drawn from the supply reel 120 by a capstan 132 and associated rubber pressure wheel 134 and fed around a guide roller 136 to the take-up reel 126.

Interconnecting the friction discs 122 and 130 is roller means indicated generally at 138 and comprising a pair of rollers 140 and 142 rigidly connected by a shaft or spindle 144. The shaft or spindle 144 is axially movable in a block 146 supported for angular adjustment about a pivot shaft 147 carried by a bracket 148 including spring means 150 urging the block and hence the rollers 140 and 142 downwardly. The bracket 148 has an arm 152 carrying a tension spring 154 which is connected to an arm 156 on the block 146, and tending to rotate the block 146 in a clockwise direction as seen in Figure 7.

In the intermediate position illustrated in full lines in Figure 7 it will be observed that the common axis of the rollers 140 and 142 intersects the axes of the shafts 124 and 128. Accordingly, during rotation of the friction discs 122 and 130, no forces are developed tending to shift the rollers 140 and 142 axially of the shaft 144.

The device is illustrated as associated with tape feeding mechanism and in normal operation the capstan 132 and associated roller 134 draws tape or wire from the reel 120 at a uniform rate, thus rotating the reel 120 at a speed dependent upon the effective radius of the remaining quantity of record material thereon. Rotation of the reel 120 effects identical rotation of the friction disc 122 which in turn rotates the rollers 140 and 142. Rotation of the roller 142 drives the friction disc 130 and hence the take-up reel 126, the direction of rotation being as indicated by the arrows in Figure 7.

If forces are developed, such for example as an increase in tension in the record material intermediate the reels, which tend to decelerate the take-up reel 126, this will have a tendency to swing the rollers 140 and 142 in a counterclockwise direction as seen in Figure 7, toward the position illustrated in dotted lines in this figure. In this position it will be observed that the portion of the friction disc 122 in contact with the roller 140 has a component of motion to the left as seen in Figure 7. In like manner, the element of the surface of the disc 130 in contact with the roller 142 has a component of motion to the left as seen in Figure 7. Due to friction two forces are developed both of which tend to shift the rollers axially to the left and accordingly, continued rotation of the friction discs with the rollers in the position illustrated in dotted lines will result in travel of the rollers to the left. This in turn will decrease the radius between the axis of the shaft 124 and the roller 140 and will increase the radius between the axis of the shaft 128 and the roller 142. This in turn will decrease the speed of rotation of the disc 130 relative to the disc 122. Assuming the device is used as illustrated in feeding wire or tape record material, it will be apparent that the effect of the adjustment described above will be to reduce the tension in the tape. It is readily apparent that if the tension in the tape decreases, the spring 154 will cause rocking movement of the shaft 144 in a clockwise direction as seen in Figure 7, with resultant travel of the rollers 140 and 142 to the right, which in turn will produce a relative increase in speed of the disc 130 and associated reel 126 as compared to that of the disc 122 and reel 120.

From the foregoing it is also apparent that the tension of the wire or tape record material R will thus be dependent upon the tension in the spring 154 and that the tension of the material R can thus be controlled by adjusting the tension of the spring 154.

In both of the embodiments of the invention described in the foregoing smooth and substantially instantaneous adjustment of the mechanism takes places as a result of the fact that the roller or rollers contact the friction discs through a small area. In theory, only a point of this area can at any time represent true rolling contact between the surfaces of the roller or rollers and the discs. Throughout the remainder of the area constant slippage takes place. When the axis of the roll means intersects the axes of the discs, the friction between contacting surfaces of the rollers and discs is in effect a constant uniform slippage balanced in amount and direction so as to produce no forces effective to modify the true timed rotation between the friction discs as determined by the instantaneous position of the roll means. When the roll means is shifted from its intermediate position, other forces are produced which are unbalanced in nature and which will produce axial movement of the roll means. Again, these forces are acting conjointly with the forces producing the balanced slippage previously referred to, so that axial movement of the roll means takes place in a smooth uniform manner and avoids any sudden movements which would be characteristic of transition from true rolling to true sliding contact.

The self-adjusting variable speed drive has been illustrated and described particularly in conjunction with a magnetic transducer since this is one of its important fields of utility; however, the drive has other fields of utility. Thus for example, the device may be considered broadly as a self-adjusting transmission in which the driving disc and roll means drive the driven disc in such a way as to provide a stepless variation in speed of the driven disc, within the limits of the apparatus, which is inversely proportional to load on the driven disc.

Figure 9:
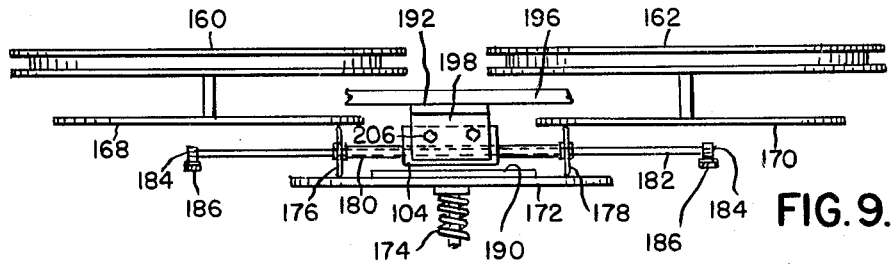
Figure 9 is a diagrammatic side elevational view of a modified arrangement applied to reel driving structure.
Figure 10:
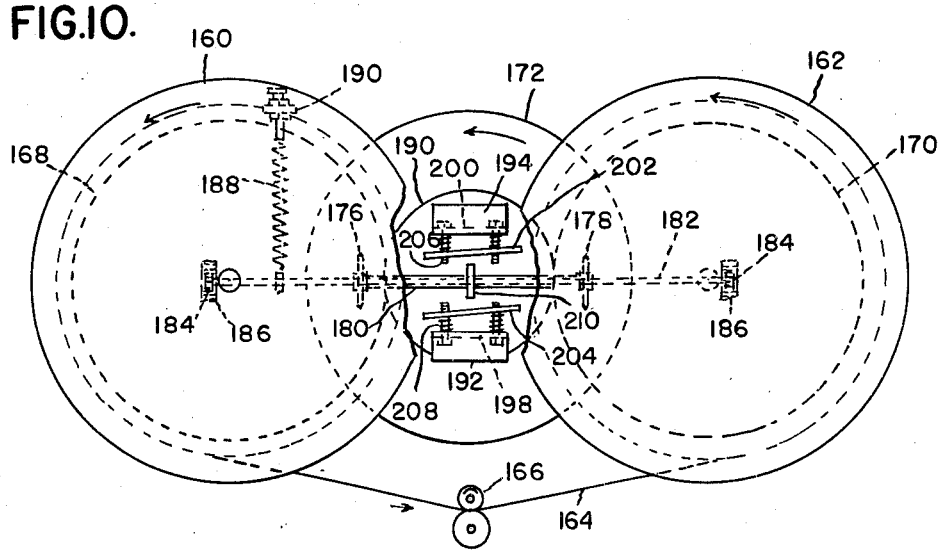
Figure 10 is a plan view of the structure shown in Figure 9.

Referring now to Figures 9 and 10 there is illustrated an arrangement in which a pair of reels such for example as a supply reel 160 and a take-up reel 162 are provided. Tape or other record material indicated at 164 is drawn by the capstan 166 from the supply reel 160 and is taken up on the reel 162. To insure proper drive of the take-up reel 162 so as to maintain tension of the tape 164 substantially equal at opposite sides of the capstan 166, friction roller and disc structure is provided. This comprises a friction disc 168 mechanically connected to the supply reel 160 and a friction disc 170 mechanically connected to the take-up reel 162. A transfer friction disc 172 is provided which is vertically movable and is biased upwardly by suitable means such for example as a compression spring indicated at 174. Interconnecting the transfer disc 172 and the discs 168 and 170 are friction rollers 176 and 178 respectively. Rollers 176 and 178 are journalled for independent rotation on a tubular sleeve 180 which in turn is mounted for axial movement along the shaft 182. The shaft 182 has small pinions 184 at its ends which rest upon short rack sections 186. The pinions 184 and rack sections 186 insure that the shaft 182, while movable in the plane of the discs in a direction perpendicular to its length, always maintains parallelism with its illustrated position.

As a result of the foregoing construction the two rollers 176 and 178 are independently rotatable but are maintained at a constant axial spacing, both being movable axially upon movement of the supporting tubular sleeve 180. As best seen in Figure 10, suitable means such for example as the compression spring illustrated at 183 and extending between the shaft 182 and an adjustable abutment 190, is provided, biasing the sleeve 180 and the shaft 182, together with the rollers 176 and 178 to one side of the line joining the axes of the reels 160 and 162.

With the parts in the relationship illustrated in Figure 10, assume rotation of the capstan 166 in the direction of the arrow, thus withdrawing tape 164 from the supply reel 160 and imparting rotation to the supply reel in the direction of the arrow. Rotation of the supply reel 160 in the direction of the arrow rotates the friction disc 168 in the same direction and accordingly, tends to rotate the friction roller 176 in a direction to impart rotation to the transfer disc 172 in the direction of the arrow thereon. This in turn through engagement with the rollers 178, drives the take-up reel 162 in the direction of the arrow applied thereto. In brief, it will be observed that friction discs 168 and 170 and the transfer disc 172 rotate in the same direction.

Action of the compression spring 188 tends to move the rollers 176 and 178 downwardly as seen in Figure 10, to a position spaced laterally from the line joining the axes of the reels 160 and 162 and the respective friction discs 168 and 170. Considering the action of the friction disc 168 and the transfer disc 172 on the roller 176 when it is displaced downwardly from its illustrated position, it will be apparent that friction disc 168 will develop forces tending to move the roller 176 to the right and that the transfer disc 172 also develops forces tending to move the friction roller to the right. Movement of the roller 176 downwardly from the position illustrated in Figure 10 however, necessarily is accompanied by a corresponding downward displacement of the roller 178. Consideration of the action between this roller and the transfer disc 172 and the friction disc 170 shows that both discs 172 and 170 establish frictional forces tending to move the roller 178 to the right.

As a result of the foregoing displacement of the rollers 176 and 178 to the right under the influence of the compression spring 188 tends to move the assembly of rollers to the right with the result that the driving friction disc 168 will engage the roller 176 further from the axis of the disc, and the transfer disc 174 will engage the roller at a distance closer to the axis of the disc. At the same time, movement of the roller 178 to the right has the effect of decreasing the effective radius of the roller with respect to the driven disc 170 and of increasing the radius of the transfer disc 172. This will produce an increase in the rate of rotation of the driven disc 170, relative to that of driving disc 168. Transfer disc 172 rotates at substantially constant r.p.m.

Preferably, means are provided for limiting axial movement of the rollers 176 and 178 and this means may comprise a stop washer 190 located on the disc 172 in position to be engaged by either roller 176 or 178 to limit axial movement of the tubular sleeve 180 with the rollers thereon.

It is also desirable to provide means for adjustably and variably limiting the amount by which the shaft 182 may be displaced from its centered position. For this purpose brackets 192 and 194 may be secured to the underside of a mounting plate 196 which corresponds to the mounting plate 10 shown in Figure 1. Bracket 192 includes a depending plate 198, and bracket 194 includes a depending plate 200. Abutment plates 202 and 204 are respectively carried from the plates 198 and 200. Plates 202 and 204 are connected to plates 198 and 200 by adjustable bolts 206 surrounded by compression springs 208. Since each of the plates 202 and 204 is connected by a pair of bolts, plates 202 and 204 may be adjusted as to spacing and angularity with respect to the axis of the shaft 182. The tubular sleeve 180 has a washer 210 thereon which in the centered position illustrated in Figure 10 may be spaced uniformly from the plates 202 and 204. Plates 202 and 204 are adjusted angularly as indicated in the figure so that as the tubular sleeve 180 moves to the right for example, the washer 210 approaches the inclined plate 202 and accordingly has a diminished amplitude of permissible displacement from centered relationship. Preferably, the arrangement is such that at its limit of movement in either direction, the washer 210 is substantially in contact with one or the other of the plates 202 or 204 when in centered relationship.

It will of course be obvious that the capstan 166 may be reversed and the supply reel become the take-up reel and vice-versa.

Referring now to Figures 11–16 there is disclosed a further embodiment of the present invention designed particularly for a self-adjusting variable speed drive for advancing record material such as film, tape, wire or the like, and including means to effect adjustment in tension of the record material at opposite sides of a capstan used in conjunction therewith.

The apparatus comprises an upper mounting plate 220 and a lower mounting plate 222. The upper mounting plate 220 is provided with spaced apertures 224 which receive downwardly extending sleeve portions 226 of reel shaft bearings which include outwardly extending flanges 228 by means of which the bearings are secured to the upper mounting plate 220. Extending through the sleeve portions 226 of the bearings, and upwardly thereabove are reel shafts 230. Secured to the lower ends of the reel shafts 230 are friction discs 232 having upwardly extending hubs 234. Intermediate the hubs 234 and the lower ends of the sleeve portions 230 of the reel shaft bearings are thrust bearings indicated diagrammatically at 236.

Supply reel support means indicated generally at 240 is carried by the upper end of one of the shafts, and take-up reel support means indicated generally at 242 is attached to the upper end of the other reel supporting shaft. Reel support means 240 and 242 will be described in detail subsequently.

Extending upwardly from the lower support plate 222 is a support pillar 246 rigidly attached to the support plate 222 by means indicated generally at 248. Vertically slidable on the pillar 246 is a sleeve 250 terminating at its upper end in thrust bearing means indicated diagrammatically at 252. A compression spring 254 is provided urging the sleeve 250 and thrust bearing 252 upwardly.

Supported on the upper end of the pillar 246 for rotation thereon and for vertical movement thereon is a friction drive disc 256 having a depending hub 258 engaging the upper end of the thrust bearing indicated at 252.

From an inspection of Figures 11 and 12 it will be observed that the friction drive disc 256 is midway between discs 232 with its axis parallel to the axes of the discs 232. Moreover, the diameters of the friction discs 232 and 256 are such that substantial overlap between peripheral portions of the discs exists. In order to transmit rotation from the friction drive disc 256 to the driven discs 232, there is provided a pair of friction rollers. Since these rollers are identical in design and mounting, only one will be described in detail. The drive roller is designated 260 which is mounted for free rotation and for free axial movement on a shaft 262. The shaft 262 at its ends has fixedly secured thereto a pair of small pinions 264 which are supported on short rack sections 266. The purpose of the rack-pinion construction is to insure that during any movement of the shaft 262 which takes place incidental to operation of the apparatus, the axis of the shaft 262 remains at all times parallel to a line joining the axes of the discs 232.

In the foregoing construction it is assumed that the reel supporting shaft to the left of the figures which carries the reel support device 240 is adapted to support a supply reel indicated at 268, and that a take-up reel 270 is mounted on the other shaft. Flexible record material 272 is drawn from the supply reel 268 and is wound up on the take-up reel 270. For this purpose the intermediate portion of the record material is wrapped partially around a driving capstan 274 and thence partially around a rubber friction roller 276 which is mounted for free rotation and whose function is to press the record material 272 firmly against the capstan to prevent slippage and to insure uniform advance of the record material. It will be understood that where the record material is for example magnetic tape, a recording or reproducing head (not shown) will be provided adjacent the capstan.

In order to provide means for independently adjusting tension in portions of the record material at opposite sides of the capstan so as to cause the tension in these portions of the record material to be substantially equal or to bear a predetermined relationship to each other, separately adjustable resilient means are provided for biasing the rollers 260 in the required direction. As best seen in Figure 11, the resilient means may be in the form of a compression spring 280 having one end connected to the shaft 262 and having its other end engaging the head 282 of an adjusting screw 284 extending through a fixed support bracket 286 which may be supported from the lower plate 222. A similar spring 288 is provided for biasing the shaft 262 associated with the take-up reel 270.

In order to limit the amount by which the shafts 262 may be displaced from the line joining the centers of the discs 232, a bracket 290 may be provided depending from the upper plate 220 and including depending spaced plates 292 each of which is provided with a pair of adjustable abutment screws 294. The adjustment screws 294 are thus arranged in pairs at opposite sides of each of the shafts 262 and may be adjusted to limit transverse movement of the shafts as desired. Axial travel of roller 260 is limited by engagement with abutments 295 and 297.

In order to obtain the desired drive, means are provided for effecting direct drive of both the driving disc 256 and the capstan 274. For a further description of this means reference is now made to Figures 13 and 14. As diagrammatically indicated in these figures, drive of the disc 256 and the capstan 274 is accomplished from a single motor indicated diagrammatically at 298 which includes a drive shaft 300. The capstan 274 has rigidly coupled thereto a relatively heavy flywheel 302 and intermediate the flywheel 302 and the drive shaft 300 of the motor is a driving idler 304 which is displaced from the line joining the center of the motor shaft and the capstan and is preferably provided with spring means urging it into the space therebetween to effect a positive drive in a manner similar to that employed in connection with the idler 70 in Figure 3. The means for effecting drive of the driving friction disc 256 comprises a driving idler indicated generally at 306 and including a reduced portion 308 in friction contact with the periphery of the driving friction disc 256 and an enlarged portion 310 in friction contact with the drive shaft 300 of the motor. The diameters of the parts driven from the motor are selected to produce the required speed ratio between the capstan and the friction drive disc 256.

In the embodiments of the invention previously described the friction disc directly associated with the supply reel was driven as a result of positive withdrawal of tape therefrom by the capstan and rotation of the friction disc associated with the supply reel was used as the source of power for driving the friction disc associated with the take-up reel. As a result of this the tension in the portion of the tape between the capstan and the supply reel was necessarily greater than the tension in the portion of the tape between the capstan and the take-up reel. This condition in some cases may not represent a serious defect but in other cases it is desirable to maintain tension in the aforesaid portion of the tape at substantially the same value. This is accomplished by the present construction as will now be described.

In accordance with principles fully set forth in the foregoing, axial travel of the rollers 260 results when the rollers are displaced to either side of a line joining the centers of the driving and driven friction discs. The compression springs 280 and 288 establish forces tending to move the friction discs to one side of the line of centers and more specifically, to that side of the line of centers which produces axial travel of the rollers in a direction to increase the tension in the record material. Accordingly, each of the rollers 260 is acted on by its own independently adjustable resilient means so that the tension in the portion of the tape intermediate the capstan 274 and the supply reel 268 may be adjusted by adjustment of the spring 280. In like manner, tension in the tape intermediate the capstan 274 and the take-up reel 270 may be adjusted by independent adjustment of the compression spring 288. Accordingly, tension at opposite sides of the capstan 274 may be brought into substantial balance.

Figure 15:
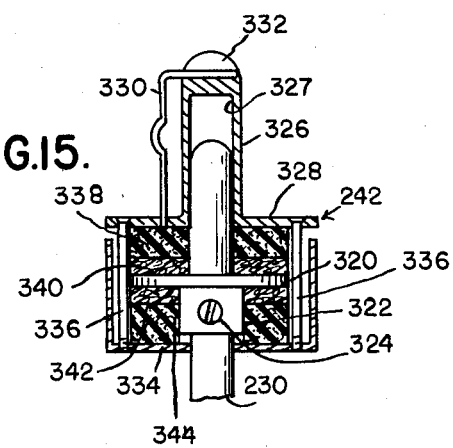
Figure 15 is an enlarged fragmentary sectional view showing friction means for supporting a reel on the apparatus shown in Figures 11 and 12.

Referring now to Figure 15 there is illustrated a sectional view of the take-up reel support means 242. The reel support shaft 230 has secured to the portion thereof above the upper support plate 220 a disc 320 having a depending collar 322 adapted to be clamped to the shaft 230 by suitable means such for example as a set screw indicated at 324. The reel support device includes an upwardly extending pilot portion 326 having a shaft receiving recess 327 and an outwardly extending flange 328. The pilot portion 326 has a spring 330 connected thereto, the upper end of the spring being freely received in a slot 332 provided at the upper end of the pilot portion. The lower end of the spring is suitably fastened to the flange portion 328. A cup-shaped member 334 is provided which is adapted to be connected to the flange 328 by adjustable screws 336 for a purpose which will presently be described. Intermediate the flange 328 and the disc 320 is an annular washer 338 formed of sponge rubber, and an annular washer 340 formed of felt. The washer 340 is in frictional contact with the upper surface of the disc 320. In like manner, annular washers 342 and 344 respectively of felt and sponge rubber, are provided between the disc 320 and the bottom wall of the cup-shaped member 334. Again, the felt washer 342 is in frictional contact with the underside of the disc 320. The pressure, and hence the friction existing between the felt washers 340 and 342 and the disc 320 is adjustable by screws 336. Preferably, the screws are tightened to a point where slippage occurs between the take-up reel support device 242 and the shaft 230 at a torque value slightly less than sufficient to cause breakage of the tape or record material.

Figure 16:
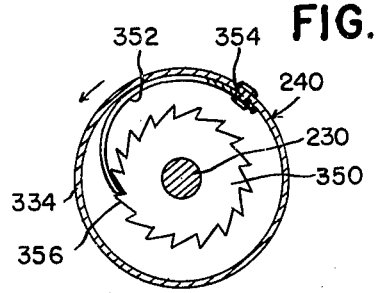
Figure 16 is an enlarged fragmentary sectional view showing ratchet means for supporting the other reel on the apparatus shown in Figures 11 and 12.

Referring now to Figure 16 there is illustrated details of the supply reel support device 240. In general this construction may be identical with that shown in Figure 15 except that instead of a friction connection, the device 240 comprises ratchet means providing a one-way connection between the reel supporting shaft 230 and the reel supporting device 240. For this purpose a ratchet disc 350 is provided which is rigidly connected to the reel supporting shaft 230 by means similar to the collar 322 illustrated in Figure 15. A leaf spring 352 is connected to the inside of the cup-like member 334, one end being attached thereto by suitable means such for example as the screw 354. At its opposite end the spring 352 is shaped to enter the spaces between the teeth 356 of the ratchet disc. With the parts as illustrated in Figure 16 it will be apparent that clockwise rotation of the supply reel mounted on the reel supporting device 240 is permitted. This permits any slack resulting from threading the tape to be taken up by direct rotation of the supply reel in a clockwise direction. At the same time, upon initiation of operation of the device, when the supply reel is rotated in a counterclockwise direction by withdrawal of tape therefrom by the capstan, a positive drive from the reel through the reel supporting device 240 to the reel shafts 230 is effected. It will of course be understood that reel supporting devices 240 and 242 may advantageously be used with any of the winding systems disclosed herein.

Referring now to Figure 17 there is diagrammatically indicated the application of the present invention as a simple transmission effective to produce variations in output speed. As diagrammatically indicated in this figure the construction includes a power input source 360 driving a shaft 362 connected to a driving friction disc 364. A driven friction disc 366 is positioned in offset relation with respect to the disc 364 in parallelism therewith. Intermediate the discs 364 and 366 is the drive roller 368 which is freely movable axially on a shaft 370. The output or driven disc 366 is connected by a shaft 372 to an output device 374 which may be of any desired type.

When the friction roller 368 contacts the discs 364 and 366 with its axis in the plane containing the axes of both of said discs 364 and 366, there are no forces tending to effect axial shifting of the roller 368 resulting from its contact with the friction discs 364 and 366. In fact, the friction roller 368 strongly resists forces applied directly thereto tending to move it axially on the shaft 370. If however, the shaft 370 is displaced in a plane parallel to the discs 364 and 366 and perpendicular to its own length while the discs are rotating, forces are developed between the discs 364 and 366 and the roller 368 causing the roller to shift axially of the shaft 370 in a direction dependent upon the direction in which the shaft 370 was displaced from its centered position, and at a rate dependent upon the amount of such displacement. Accordingly, the speed ratio of the transmission may be varied by shifting the shaft 370 perpendicular to its axis between the discs 364 and 366.

It will be understood that forces tending to move the shaft 370 perpendicular to its axis are developed by loading on the output device 374. While the device is useful as a variable speed transmission in which the friction roller 368 may be moved manually to either side of the line joining the centers of the friction discs 364 and 366, it is preferred to take advantage of the fact that loading develops forces tending to shift the roller. Thus, adjustable biasing means such for example as a spring diagrammatically indicated at 376 may be provided operating to shift the shaft 370 perpendicular to its length. In this case of course, suitable means are provided for guiding the shaft 370 to maintain its parallelism to the line joining the centers of the discs 364 and 366. Such means are diagrammatically indicated as the pinions 378 rigidly secured to the shaft 370 and rolling on short parallel rack sections 380.

With the parts in the position illustrated in Figure 17, it may be assumed that the axis of shaft 370 is coplanar with the axes of the discs 364 and 366, and that the discs are rotating. If this is so, the force applied by disc 364 to roller 368 plus the force applied by disc 366 to the roller must be equal to the force supplied by the biasing means 376. Furthermore, disregarding frictional losses, the two first mentioned forces are equal. Therefore, the biasing means must supply a force equal to twice the force which it is desired to transmit. Otherwise speed adjustment will result.

While the biasing force may conveniently be supplied by a spring, it may be desirable to vary the effectiveness of the spring as a function of some other variable. Thus, as an example, when the system is used as a vehicle transmission, the usual accelerator pedal may be operatively connected to the biasing means to effect adjustment thereof tending to increase output speed upon throttle opening movement.

The drawings and the foregoing specification constitute a description of the improved self-adjusting variable speed drive in such full, clear, concise and exact terms as to enable any person skilled in the art to practice the invention, the scope of which is indicated by the appended claims.

What I claim as my invention is:

1. Variable ratio drive means comprising a pair of friction discs rotatable with their axes parallel and spaced apart, roller means engaging both of said discs and having a position with its axis perpendicular to and intersecting the axes of both of said discs and being movable axially to vary the drive ratio, a shaft coaxial with said roller means on which said roller means is mounted for rotation and axial movement, pinions at the ends of said shaft, rack sections parallel to the planes of said discs on which said pinions are supported, means mounting said roller means for transverse movement perpendicular to its axis in a plane parallel to the plane of said discs, and means connected to said roller means to impose an increasing resistance to transverse movement of said roller means.

2. Mechanism for drawing elongated record material from a supply reel, winding the material on a take-up reel, providing a uniform rate of advance of the material at a zone intermediate the reels, and providing independently controllable tension in portions of the material between said zone and both of said reels which comprises a pair of driven friction discs rotatable respectively with said reels, said discs being coplanar, a driving disc occupying a plane parallel to the plane of said driven discs and overlapping edge portions of both of said driven discs, a friction roller between and in contact with overlapped portions of each of said driven discs and said driving disc, each of said rollers being axially movable and having its axis parallel to a line joining the axes of the discs which it contacts and being movable independently of the other roller in a plane parallel to the discs and perpendicular to its own axis, independently adjustable resilient means biasing each of said rollers in a direction to increase tension in the material between the reel engaged thereby and said zone, a capstan frictionally engaging said material in said zone to advance the material at a uniform rate, and means for driving said capstan and said driving disc at uniform ratio.

3. Mechanism as defined in claim 2 comprising friction drive means intermediate said take-up reel and its driven friction disc.

4. Mechanism as defined in claim 2 comprising one-way drive means between said supply reel and its driven friction disc.

References Cited in the file of this patent

UNITED STATES PATENTS

| | | |
|---|---|---|
| 1,384,357 | Spencer et al. | July 12, 1921 |
| 1,981,370 | Mowat | Nov. 20, 1934 |
| 2,907,632 | Madle | Nov. 2, 1937 |
| 2,468,198 | Heller | Apr. 26, 1949 |
| 2,576,459 | Holzman | Nov. 27, 1951 |
| 2,603,425 | Barbara et al. | July 15, 1952 |
| 2,609,998 | Sear | Sept. 9, 1952 |
| 2,634,064 | Carroll | Apr. 7, 1953 |

FOREIGN PATENTS

| | | |
|---|---|---|
| 313,672 | Great Britain | June 20, 1929 |
| 363,549 | Great Britain | Dec. 24, 1931 |